United States Patent [19]

Kawamura

[11] Patent Number: 4,998,517
[45] Date of Patent: Mar. 12, 1991

[54] HEAT INSULATING ENGINE
[75] Inventor: Hideo Kawamura, Samukawa, Japan
[73] Assignee: Isuzu Motors, Tokyo, Japan
[21] Appl. No.: 378,938
[22] Filed: Jul. 12, 1989
[30] Foreign Application Priority Data Jul. 21, 1988 [JP] Japan .................................. 63-180250

[51] Int. Cl.$^5$ ................. F02B 19/10; F02B 75/08; F02B 77/02
[52] U.S. Cl. ..................................... 123/270; 123/668
[58] Field of Search ............... 123/270, 271, 668, 669

[56] References Cited

U.S. PATENT DOCUMENTS

| 4,511,612 | 4/1985 | Müther et al. | 123/270 |
| 4,616,611 | 10/1986 | Ogawa et al. | 123/270 |
| 4,738,227 | 4/1988 | Kamo et al. | |
| 4,796,572 | 1/1989 | Heydrich | 123/668 |
| 4,909,230 | 3/1990 | Kawamura | 123/668 |

FOREIGN PATENT DOCUMENTS

| 2804562 | 8/1979 | Fed. Rep. of Germany. | |
| 2919743 | 11/1980 | Fed. Rep. of Germany. | |
| 59-46317 | 3/1984 | Japan | 123/270 |
| 0302124 | 12/1988 | Japan | 123/668 |
| 2061383 | 5/1981 | United Kingdom. | |

OTHER PUBLICATIONS

Patent Abstracts of Japan, vol. 10, No. 342 (M-536) (2398) 19 Nov. 1986, & JP-A-61 142320 (Mitsubish Heavy Ind. Ltd.) 30, Jun. 1986.
Patent Abstracts of Japan, vol. 10, No. 388 (M-549) (2445) 25 Dec. 1986, & JP-A-61 178514 (Toyota Motor Corp.) 11 Aug. 1986.

Primary Examiner—Tony M. Argenbright
Assistant Examiner—Robert E. Mates
Attorney, Agent, or Firm—Browdy and Neimark

[57] ABSTRACT

In this heat insulating engine, an auxiliary combustion chamber which is formed by a block consisting of a material of a low heat transfer rate and provided on the inner surface thereof with a thin member composed of a high-density ceramic material, and which is provided with a fuel injection nozzle in the wall thereof, is communicated with a main combustion chamber fitted in a cylinder head via a heat insulating member and formed by a thin member consisting of a high-density ceramic material. Accordingly, the thermal capacity of the inner surface of the auxiliary combustion chamber becomes small, and the mixing of the atomized fuel with air is effected speedily. Consequently, the combustion temperature increases in a short period of time, and the generation of smoke is suppressed. The gaseous mixture is then blow out as a flame from the auxiliary combustion chamber into the main combustion to suddenly reduce the fuel equivalent ratio, so that the combustion temperature also lowers to supress the generation of NOx.

16 Claims, 1 Drawing Sheet

HEAT INSULATING ENGINE

BACKGROUND OF THE INVENTION:

1. Field of the Invention:

This invention relates to an heat insulating engine consisting mainly of a ceramic material and provided with an auxiliary combustion chamber.

2. Description of the Prior Art:

A conventional heat insulating engine utilizing a ceramic material as a heat resisting material is disclosed in, for example, Japanese Patent Laid-Open No. 46317/1984. The parts of a combustion chamber in the internal combustion engine will now be described with reference to FIG. 2. The parts of the combustion chamber in the internal combustion engine include parts constituting an auxiliary combustion chamber, a cylinder head 41, a cylinder liner 44, a piston 45, and parts of a combustion chamber which constitute the inner surface of the combustion chamber, and these parts are formed out of a ceramic material having excellent heat insulating characteristics. The cylinder head 41 is combined with a cylinder block 42 via a gasket 43, and the cylinder liner 44 is fixed to the cylinder block 42. A vortex chamber 47 formed in the cylinder head 41 consists of upper and lower vortex chamber members 48, 49 fitted in the cylinder head 41. The lower vortex chamber 49 is provided with an ejection port 50 which communicates the vortex chamber 47 and a main combustion chamber 46 with each other. A fuel injection nozzle 52 and a glow plug 53 are provided in the cylinder head 41. The upper and lower vortex chamber members 48, 49 are formed as combustion chamber parts out of a ceramic material of a non-oxide of silicon, such as a silicon nitride ceramic material and a silicon carbide ceramic material. The material of the surfaces defining the vortex chamber 47 and ejection port 50 is converted into a silicon oxide ceramic material due to the heating of the non-oxide ceramic material to a high temperature. A thin layer of a catalyst of a noble metal, such as platinum, rhodium and palladium is formed on each of these surfaces by spattering. Owing to such a construction, these combustion chamber parts prevent the separation of a thin layer 51 of a noble metal catalyst, minimizes the deterioration of the catalyst and reduces an unburnt hydrocarbon content of an exhaust gas.

However, it is very difficult to sufficiently obtain the heat insulating characteristics in a heat insulating engine having a cylinder head utilizing these ceramic materials as heat insulating or heat resisting materials, and, in such an engine, the wall thickness is increased for the purpose of meeting the requirements. Namely, the portions of such an engine which face the combustion chamber can be formed so that they can withstand a high-temperature combustion gas, by making them of a ceramic material, such as silicon nitride having high thermal resistance and thermal shock resistance and excellent heat insulating characteristics. However, when the wall thickness is too large, the thermal capacity of the wall surface increases. Consequently, the suction air receives the heat energy accumulated on the inner surface, and is thermally expanded, so that the suction efficiency decreases.

The thicknesses of the constituted parts of the combustion chamber in the internal combustion engine disclosed in Japanese Patent Laid-Open No. 46317/1984 referred to previously are all large, and the thin layer 51 consists of a noble metal as mentioned above. In addition, the upper and lower vortex chambers 48, 49 are formed out of a ceramic material of silicon nitride or silicon carbide which has a high heat resistance and not so good heat insulating characteristics. Therefore, the thermal capacity of the surface of each part of the combustion chamber becomes high, and the thermal capacity of the parts exposed to a high temperature cannot be reduced to a low level. This makes it impossible to prevent a decrease of the suction efficiency. Moreover, it is impossible in this construction to speedily carry out the mixing of atomized fuel with air.

SUMMARY OF THE INVENTION

A primary object of the present invention is to solve the problems referred to above, and provide a heat insulating engine, in which the ceramic members constituting the inner surfaces of main and auxiliary combustion chambers are formed by thin members the inner surfaces of which are covered with a heat insulating material, so as to minimize the thermal capacity of these inner surfaces, this enabling the suction efficiency of the engine to be improved, the mixing of atomized fuel with air to be done speedily owing to the improvement of the suction efficiency, the combustion temperature to be increased in a short period of time, the combustion time in a smoke generating combustion zone to be minimized whereby the generation of smoke is suppressed, the gaseous mixture to be then to be blown out as a swirled flame from the auxiliary combustion chamber into the main combustion chamber whereby a sudden decrease of the equivalent ratio of the fuel and a decrease of the combustion temperature are effected, and the combustion in a NOx generating combustion zone to be thereby prevented whereby the generation of NOx is suppressed.

Another object of the present invention is to provide a heat insulating engine, in which, in order to prevent a decrease of the strength of the auxiliary and main combustion chambers, which is ascribed to the reduction of the thickness of the high-density ceramic material constituting the inner surfaces of these combustion chambers, a layer of heat insulating material is formed on the outer surface of the thin members constituting these inner surfaces, so as to thermally insulating the same inner surfaces and increase the strength of the walls of the combustion chambers.

Still another object of the present invention is to provide a heat insulating engine, in which an auxiliary combustion chamber which has a thin layer of a high-density ceramic material formed on the inner surface of an auxiliary combustion chamber block consisting of a material of a low heat conductivity, and which is provided with a fuel injection nozzle, is communicated via a communication port with a main combustion chamber consisting of a thin wall of a high-density ceramic material and fitted in a cylinder head via a heat insulating material.

A further object of the present invention is to provide a heat insulating engine, in which a main combustion chamber consists of a unitary combination of a thin lower head-surface member and thin liner members which are attached to the lower surface of a cylinder head and composed of a high-density ceramic material, the thin liner members being fitted in the portions of the cylinder head which are on the upper side of a cylinder liner, which consists of a material of a low heat transfer rate, to thermally insulate the thin liner member, improve the strength of the same member, a part to which a load is imparted, and prevent the thin member, a wall surface member, from being destroyed even when the temperature and pressure in the interior of the main combustion chamber are high.

A further object of the present invention is to provide a heat insulating engine, in which a main combustion chamber consists of a unitary combination of a thin lower head-surface member and thin liner members which are attached to the lower surface of a cylinder head and composed of a high-density ceramic material, the thin liner members being fitted in the portions of the cylinder head which are on the upper side of a cylinder liner, which consists of a material of a low heat transfer rate, to thermally insulate the thin liner member and improve the strength of the same member, a part to which a load is imparted, the portion of a piston head which is opposed to the main combustion chamber being provided with a thin member of a high-density ceramic material so as to reduce to a low level the thermal capacity of the surfaces of all walls that form the main combustion chamber.

In order to improve the suction efficiency of a heat insulating engine, it is necessary that the quantity of heat which the suction air receives from the inner surface of the combustion chamber be minimized. In order to reduce the quantity of heat which the suction air receives from the inner surface of the combustion chamber, it is important to form to a small thickness the ceramic members, which form the inner surfaces the temperature of which becomes high, thermally insulate these surfaces by a heat insulating material and minimize the thermal capacity thereof. When the thermal capacity of the inner surfaces of the combustion chamber, the amplitude of temperature thereof increases, and, during a suction stroke of the engine, these inner surfaces are cooled immediately due to the suction air to cause the difference between the temperature of the suction air and that of the inner surfaces to become small. Consequently, the quantity of heat which the suction air receives from the inner surfaces becomes small, and the thermal expansion of the suction air is suppressed, whereby the occurrence of a great decrease of the flow rate of the suction air can be prevented. Namely, the suction efficiency of the engine can be improved by designing the engine so that the temperature of the inner surfaces varies in accordance with that of the suction air. When the thermal capacity of the surface of the wall of the combustion chamber is small, the thermal energy is not absorbed so much in the inner surface. Therefore, the temperature of the wall surface increases immediately due to the combustion of a gaseous mixture, and the rate of radiation of heat from the inner surface decreases, the thermal energy being recovered by an energy recovering unit, which is provided on the downstream side of the combustion chamber, and effectively utilized.

In general, in a fuel combustion zone of a heat insulating engine, a smoke generating zone in which smoke occurs lies in the portion of the combustion zone which has a high fuel equivalent ratio, a fuel-air ratio, and a low combustion temperature. Also, a NOx generating zone in which NOx occurs lies in the portion of the combustion zone which has a low fuel equivalent ratio and a high combustion temperature. Accordingly, it is preferable that the combustion of a fuel in a heat insulating engine be carried out in the portion of a combustion zone thereof which excludes the smoke generating combustion zone and NOx generating combustion zone, or that the combustion of the fuel in these two undesirable combustion zones by speedily finished.

The heat insulating engine according to the present invention has construction meeting the conditions mentioned above. Since the thermal capacity of the inner surface of the auxiliary combustion chamber and the volume of the combustion chamber are small, the fuel is injected from the fuel injection nozzle into the auxiliary combustion chamber to immediately set the fuel equivalent ratio to a fuel enriching level. Especially, since the thermal capacity of the inner surface of the auxiliary combustion chamber and the volume of the chamber are small, the mixing of the atomized fuel with air is done speedily, and the temperature of the resultant gaseous mixture is increased in a short period of time. Consequently, the combustion in the smoke generating combustion zone, which is determined by the fuel equivalent ratio and combustion temperature, is speedily finished, and the flame is blown out in a swirled state from the auxiliary combustion chamber into the main combustion chamber, so that the fuel equivalent ratio decreases suddenly or in a short period of time in the main combustion chamber. Moreover, since the temperature of the main combustion chamber varies in strict accordance with that of the suction air, suction rate of the air introduced into the engine does not decrease. Accordingly, the combustion temperature drops as the fuel equivalent ratio lowers. This enables the prevention of combustion in the NOx generating.

Therefore, the heat insulating engine according to the present invention enables combustion to be carried out in the auxiliary and main combustion chamber with the generation of smoke and NOx prevented.

DESCRIPTION OF THE PREFERRED EMBODIMENT

Figure 1:
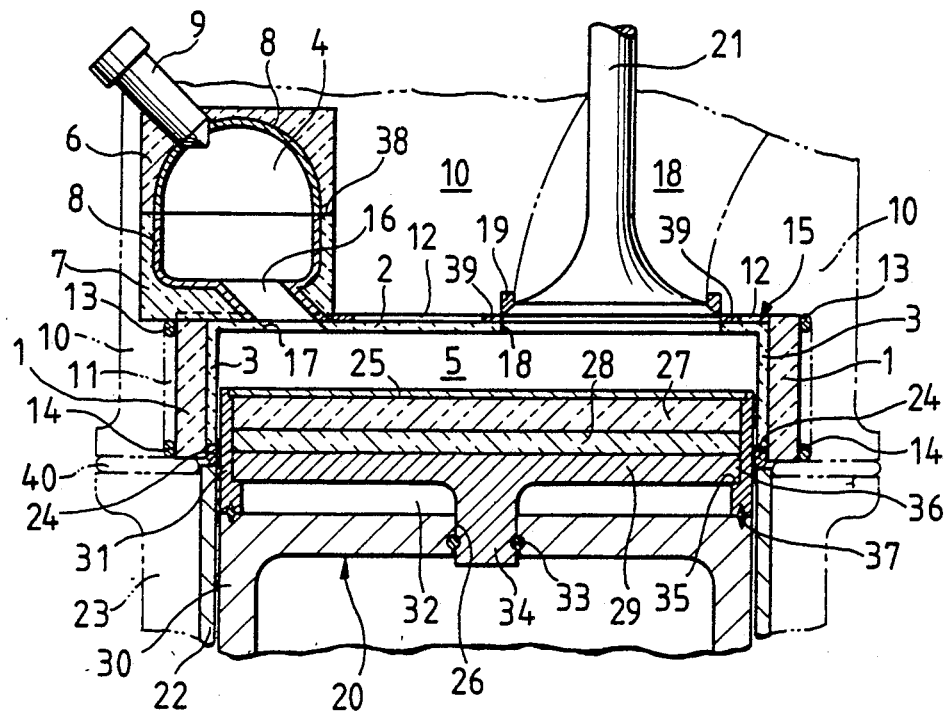
FIG. 1 is a sectional view of an embodiment of the heat insulating engine according to the present invention.
Figure 2:
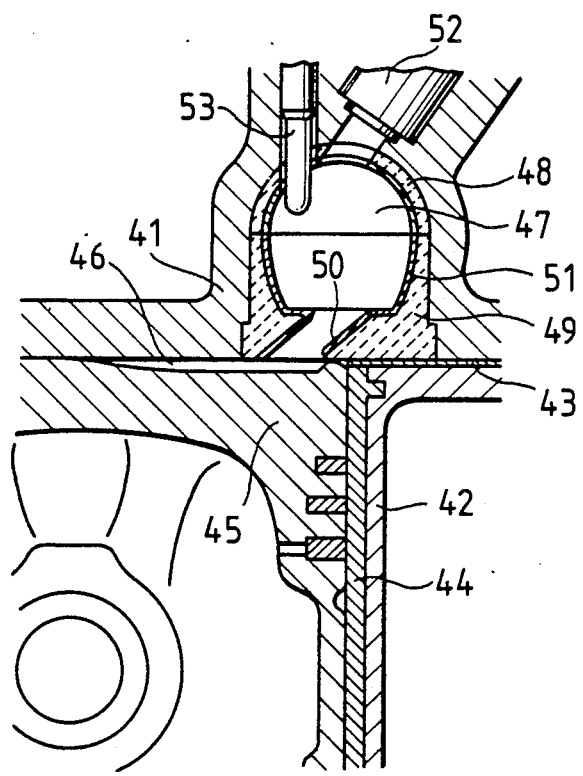
FIG. 2 is a sectional view of an example of a diesel engine in which conventional parts of a combustion chamber are incorporated.

An example of the construction of the heat insulating engine according to the present invention will now be described in detail with reference to the drawing.

FIG. 1 is a schematic section showing the construction of a heat insulating engine embodying the present invention. This heat insulating engine is constructed so that an auxiliary combustion chamber 4 which has an auxiliary combustion chamber block of a material of a low heat transfer rate, the inner surface of which is formed by a thin member 8 consisting of a high-density ceramic material, and which is provided with a fuel injection nozzle 9, is communicated with a main combustion chamber 5 consisting of a thin member composed of a high-density ceramic material and fitted in a cylinder head 10 via heat insulating members.

The cylinder head 10 is made of a casting, and a cylinder upper portion 1 is fitted in the cylinder head via ring-shaped heat insulating gaskets 13, 14, a heat insulating air layer 11 being formed between the inner circumferential surface of the cylinder head 10 and the outer circumferential surface of a cylinder upper portion 1. A head liner 15 consisting of a thin cylinder liner upper portion 3 combined unitarily with a thin head lower portion 2 is made of thin members of a high-density ceramic material, such as silicon nitride and silicon carbide, and fitted in a cylinder upper portion 1 to constitute the surface of the main combustion chamber 5. Heat insulating layers 12 are formed between the lower surface of the cylinder head 10 and thin head lower portion 2, which is formed unitarily with the head liner 15, via heat insulating gaskets 39. The thin cylinder liner upper portions 3 constituting the head liner 15 is press fitted closely in the cylinder upper portion 1 consisting of a heat insulating material of a low heat transfer rate, such as aluminum titanate and potassium titanate so as to improve the strength of a thin cylinder liner upper portion 3 and heat insulating characteristics of the main combustion chamber 5. Accordingly, the head liner 15 consisting of a thin cylinder liner upper portion 3 formed unitarily with a thin head lower portion 2 can be formed to a smallest possible thermal capacity.

A thin head lower portion 2 is provided with a communication port 17, which is communicated with a communication port 16 of the auxiliary combustion chamber 4, and suction and exhaust ports 18 (only one of them is shown in the drawing) in which suction and exhaust valves 21 are installed. Each valve 21 is set on a valve seat 19 provided in the cylinder head 10. Each of the suction and exhaust ports 18 is formed in a position determined correspondingly to the valve seat 19. The lower end surfaces of a thin cylinder liner upper portion 3 in the head liner 15 are joined to a cylinder liner 22 via a heat insulating gasket 24. The cylinder liner 22 is fitted in a cylinder in the cylinder block 23, and the cylinder head 10 is fixed to the cylinder block 23 via a gasket 40.

The auxiliary combustion chamber 4 has construction similar to the main combustion chamber 5, and is formed by fixing a thin member 8 consisting of a high-density ceramic material to the inner circumferential surface of an auxiliary combustion chamber block formed out of a material of a low heat transfer rate by combining the upper block 6 of the auxiliary combustion chamber with the lower block 7 thereof at a contact portion 38 (intermediate portion in the drawing) of the end surfaces thereof. The upper block 6 of the auxiliary combustion chamber 4 is provided with the fuel injection nozzle 9, and the lower block 7 thereof the communication port 16. These upper and lower blocks 6, 7 are formed out of a heat insulating material having a low heat transfer rate and a low Young's modulus, such as aluminum titanate, potassium titanate and sodium titanate. A thin member 8 consisting of a high-density ceramic material, such as silicon nitride and silicon carbide is applied to the inner surface of the auxiliary combustion chamber 4. The fixing of the thin member 8 to the inner surfaces of the upper and lower blocks 6, 7 of the auxiliary combustion chamber can be done by, for example, the chemical vapor deposition (CVD) of the mentioned material on these surfaces or coating these surfaces with the mentioned material. The thin member 8 consisting of a high-density ceramic material, such as silicon nitride and silicon carbide is attached to the inner surface of the communication port 16 in the same manner as in the auxiliary combustion chamber 4, which communication port 16 communicates the auxiliary and main combustion chambers 4, 5 with each other. This enables the inner surface of the auxiliary combustion chamber, in other words, the thin member 8 to be formed to a smallest possible thermal capacity.

The communication port 16 which communicates the auxiliary and main combustion chambers 4, 5 with each other is extended diagonally so that the swirling of a flame is promoted in the auxiliary combustion chamber 4 or main combustion chamber 5 in accordance with the entry and discharge of a fluid. In order to promote the mixing of atomized fuel with air in the auxiliary combustion chamber 4, the axis of the communication port 16 and that of the fuel injection nozzle 9 are set out of alignment and in a mutually opposed state.

A thin cylinder liner upper portion 3 in a cylinder upper portion 1 and a piston 20 reciprocatingly moved in the cylinder liner 22 are formed in a heat insulating manner. This piston 20 has a piston head, and a piston skirt 30 fixed to the piston head. The piston head has a piston head body 29, a thin head member 25 consisting of a high-density ceramic material attached to the side of the piston head body which is opposed to the main combustion chamber 5, and heat insulating members 27, 28 provided between the piston head body 29 and thin head member 25. This thin head member 25 is formed out of a high-density ceramic material, such as silicon nitride and silicon carbide, and to a thickness of, for example, around 1 mm or not more than 1 mm. The thin head member 25 is provided on its outer circumferential surface with a thin ring member 31 consisting of the same material and fixed thereto by the chemical vapor deposition. The thin head member 25 is fixed to the piston head body 29 by the ring member 31 via the heat insulating members 27, 28. The ring member 31 is provided on its inner circumferential surface with a stepped portion 35, and the piston head body 29 is fitted in the ring member 31 so that an outer circumferential portion 36 of the piston head body 29 engages the ring member 31.

The piston head body 29 has a mounting boss 34 at the central portion thereof, and is formed out of a material having a coefficient of thermal expansion substantially equal to that of a ceramic material, a high strength and a comparatively high Young's modulus, for example, cermet and a metal. The surface of this piston head body 29 which is on the side of the combustion chamber 5 is formed flat, and the piston skirt 30 is provided at its central portion with a mounting hole 26 in which the mounting boss 34 of the piston head body 29 is fitted. The mounting boss 34 of the piston head body 29 is fitted in the central mounting hole 26 in the piston skirt 30, and a metal ring 33 is inserted in a deformed state into both a groove formed in the mounting boss 34 and a groove formed in the inner surface of the central mounting hole 26, the piston head body 29 being engaged in a pressed state with the piston skirt 30. A heat insulating air layer 32 is formed between the piston head body 29 and piston skirt 30.

The heat insulating members 27, 28 provided between the thin head member 25 and piston head body 29 consist of a material, such as potassium titanate, aluminum titanate, whiskers of potassium titanate and zirconia fiber. These members 27, 28 function as excellent heat insulators and also as structural members for receiving the pressure applied to the thin head member 25 at an explosion stroke. Since the piston head body 29 is engaged in a pressed state with the piston skirt 30, the outer circumferential portion 36 of the piston head body 29 is pressed against the stepped portion 35 of the ring member 31, and the ring member 31 against the circumferential portion of the piston skirt 30. In this embodiment, a carbon seal 37, a kind of gasket, is provided so as to seal the ring member 31 and piston skirt 30.

With regard to the construction of the piston 20, it is necessary that the compressive force occurring due to an explosion be received equally by the heat insulating members 27, 28 of aluminum titanate, potassium titanate or sodium titanate. Accordingly, the surface of the piston head body 29 which is on the side of the main combustion chamber 5, and the thin head member 25 are formed flat.

What is claimed is:

1. A heat insulating engine comprising:
   a cylinder head provided with suction and exhaust ports;
   a head lower portion provided in said cylinder head;
   a cylinder liner upper portion formed integrally with said head lower portion;
   a main combustion chamber formed with said head lower portion and said cylinder liner upper portion;
   auxiliary combustion chamber blocks provided on said cylinder head and consisting of a material of a low heat conductivity;
   thin members provided on the inner surfaces of said auxiliary combustion chamber blocks and consisting of a high-density ceramic material;
   an auxiliary combustion chamber formed on the inner side of said thin members on said blocks;
   a fuel injection nozzle provided in said cylinder head and adapted to inject a fuel into said auxiliary combustion chamber;
   a communication port formed in said auxiliary chamber block and communicating said main and auxiliary combustion chambers with each other; and
   a thin member provided on the inner circumferential surface of said communication port and consisting of a high density ceramic material.

2. A heat insulating engine comprising:
   a cylinder head provided with suction and exhaust ports;
   a thin head lower portion provided in said cylinder head and consisting of a high-density ceramic material;
   a heat insulating layer formed between said cylinder head and said thin head lower portion;
   a cylinder upper portion provided in said cylinder head and consisting of a heat insulating material;
   a thin cylinder liner upper portion formed integrally with said thin head lower portion out of a high-density ceramic material and fitted in the inner circumferential surface of said cylinder upper portion;
   a main combustion chamber formed with said thin head lower portion and said thin cylinder liner upper portion;
   an auxiliary combustion chamber block provided on said cylinder head and consisting of a material of a low heat conductivity;
   a thin member provided on the inner surface of said auxiliary combustion chamber block and consisting of a high-density ceramic material;
   an auxiliary combustion chamber formed with said thin member on said block with a fuel injection nozzle opened thereinto;
   a communication port formed in said auxiliary combustion chamber block and communicating said main and auxiliary combustion chambers with each other; and
   a thin member provided on the inner surface of said communication port and consisting of a high-density ceramic material.

3. A heat insulating engine according to claim 2, wherein said high-density ceramic material constituting said thin head lower portion, said thin cylinder liner upper portion, said thin member on the inner surface of said auxiliary combustion chamber and said thin member on the inner surface of said communication port is silicon nitride.

4. A heat insulating engine according to claim 2, wherein said high-density ceramic material constituting said thin head lower portion, said thin cylinder liner upper portion, said thin member on the inner surface of said auxiliary combustion chamber and said thin member on the inner surface of said communication port is silicon carbide.

5. A heat insulating engine according to claim 2, wherein said material of a low heat transfer rate constituting said auxiliary combustion chamber block is aluminum titanate.

6. A heat insulating engine according to claim 2, wherein said material of a low heat transfer rate constituting said auxiliary combustion chamber block is potassium titanate.

7. A heat insulating engine according to claim 2, wherein said material of a low heat transfer rate constituting said auxiliary combustion chamber block is sodium titanate.

8. A heat insulating engine according to claim 2, wherein said heat insulating material constituting said cylinder upper portion is aluminum titanate.

9. A heat insulating engine according to claim 2, wherein said auxiliary combustion chamber block consists of an upper block and a lower block, said upper and lower blocks being combined with each other at their respective contacting end surfaces.

10. A heat insulating engine according to claim 9, wherein said fuel injection nozzle is provided in said upper block of said auxiliary combustion chamber block, said communication port being provided in said lower block of said auxiliary combustion chamber block.

11. A heat insulating engine according to claim 2, wherein said heat insulating layer formed between said cylinder head and said thin head lower portion consists of a heat insulating gasket and a heat insulating air layer.

12. A heat insulating engine comprising:
    a cylinder head provided with suction and exhaust ports and having a tubular portion;
    a thin head lower portion provided in said cylinder head and consisting of a high-density ceramic material;
    a heat insulating layer formed between said cylinder head and said thin head lower portion;
    a cylinder upper portion provided in said cylinder head and consisting of a heat insulating material,
    a thin cylinder liner upper portion formed integrally with said thin head lower portion out of a high-density ceramic material and fitted in said cylinder upper portion;
    a main combustion chamber formed with said thin head lower portion and said thin cylinder liner upper portion;
    an auxiliary combustion chamber block provided on said cylinder head and consisting of a material of a low heat conductivity, a thin member provided on the inner surface of said auxiliary combustion chamber block and consisting of a high density ceramic material;

an auxiliary combustion chamber formed with said thin member on said block with a fuel injection nozzle opened thereinto;

a communication port formed in said auxiliary combustion chamber block and communicating said main and auxiliary combustion chambers with each other;

a thin member provided on the inner surface of said communication port and consisting of a high-density ceramic material;

a cylinder block fixed to said cylinder head;

a cylinder liner which is fitted in a cylinder formed in said cylinder block, and which is opposed at the upper end surface thereof to the lower end surface of said thin liner upper portion;

a piston adapted to be moved reciprocatingly in said cylinder liner and said thin cylinder liner upper portion and having a head portion and a skirt portion fixed to said head portion;

said piston head having a piston head body, a thin piston head plate consisting of a high-density ceramic material, and a heat insulating material provided between said piston head body and said thin piston head plate.

13. A heat insulating engine according to claim 12, wherein said high-density ceramic material constituting said thin piston head plate on said piston head is silicon nitride.

14. A heat insulating engine according to claim 12, wherein said high-density ceramic material constituting said thin piston head plate on said piston head is silicon carbide.

15. A heat insulating engine according to claim 12, wherein said heat insulating member provided on said piston head is aluminum titanate.

16. A heat insulating engine according to claim 12, wherein said heat insulating member provided on said piston head is potassium titanate.

* * * * *